July 22, 1958     D. J. WILLIAMS     2,844,068
APPARATUS FOR INDICATING AND/OR RECORDING
THE STRUCTURE OF PAPER
Filed Sept. 20, 1955
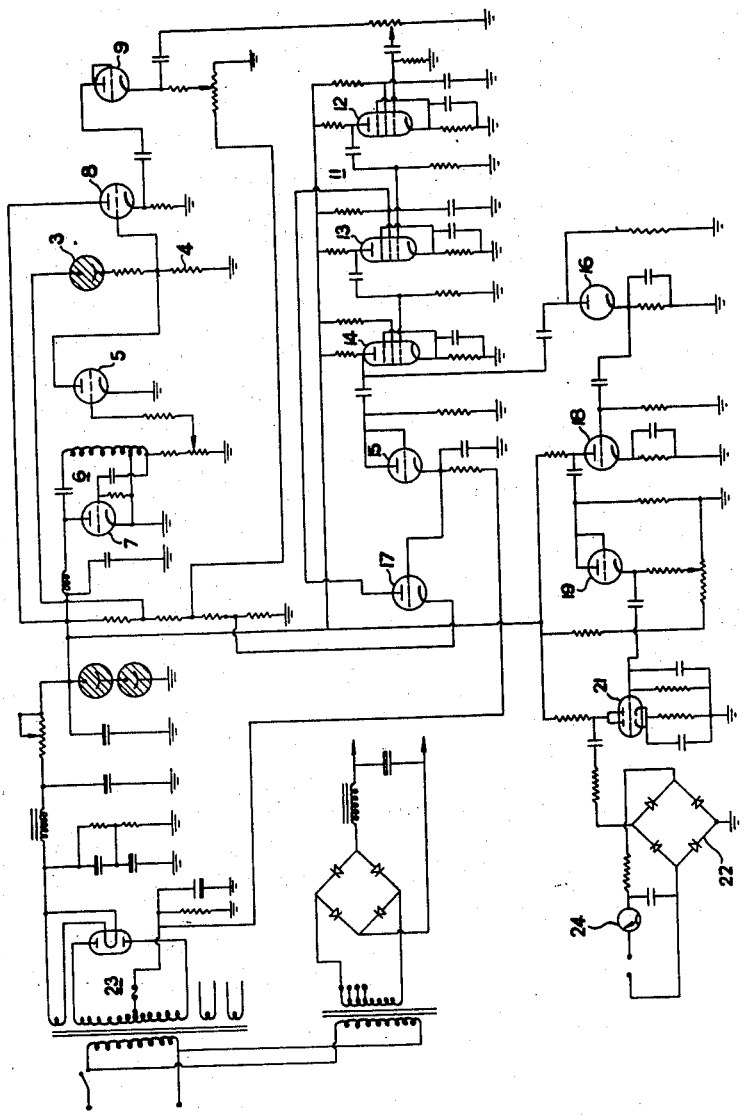
INVENTOR
DAVID JOSEPH WILLIAMS

United States Patent Office 2,844,068
Patented July 22, 1958

2,844,068

APPARATUS FOR INDICATING AND/OR RECORDING THE STRUCTURE OF PAPER

David J. Williams, Ivanhoe, Victoria, Australia, assignor to Australian Paper Manufacturers Limited, South Melbourne, Australia, a company of the State of New South Wales Application September 20, 1955, Serial No. 535,435

Claims priority, application Australia September 23, 1954

13 Claims. (Cl. 88—14)

The present invention relates to apparatus for indicating and/or recording the formation or structure of paper during the manufacture thereof.

The formation of paper is a property which has for many year been recognized as a fundamental property as, amongst other things, the strength of the paper and its printing quality are dependent upon its formation.

If a sheet of paper appears to be uniform when viewed by the aid of transmitted light it is said to be of good formation. On the other hand if it appears to be irregular or patchy it is said to be of wild or bad formation.

Many factors influence the formation of paper, a principal cause of bad formation being the innate tendency of cellulose fibres to become entangled into clots during the manufacture of the paper. Furthermore the pulp, which may be inherently strong and capable of being converted into paper of good formation, may nevertheless yield paper having bad formation if the machine used for manufacturing the paper is improperly adjusted.

The strength of the manufactured paper is usually tested at intervals but with the high production rate of modern machines many tons of inferior paper may be produced before an improper adjustment is detected and many more tons may be produced after detection but before the improper adjustment is corrected.

The formation of paper is a property which was for many years not readily measurable but it has now been proposed to provide apparatus utilizing photoelectric means for the measurement of any variation in the optical density of paper from point to point thereof. With this apparatus the paper is scanned by a spot of light and the light passing through the paper is picked up by a photoelectric cell. The output of the photoelectric cell will fluctuate according to the changing densities of the paper passing under the spot of light. This output may be regarded as including a direct current component and an alternating current component which, when translated by suitable electronic apparatus, will give resultants which can be measured to provide figures representing (a) the average light transmission of the paper and (b) the wildness of the paper, that is to say, its formation.

However, the apparatus briefly referred to above suffers principally from the objection that a sample of paper must be removed from the roll for testing purposes. Furthermore it cannot be used for continuously recording the formation of paper as it passes through the paper machine in the course of manufacture.

It is the primary object of the present invention to provide improved apparatus utilizing combined photoelectric and electronic means for continuously recording the formation of paper as it is being manufactured. This obviously is a great advantage in the manufacture of paper since the operator can see any change in formation from the record immediately it occurs and corrective measures can be taken at once if there should be any maladjustment of the paper making machine. In addition the operator can see immediately from the record the effect on formation of each change made to the paper making machine.

A further object of the invention is to provide combined photoelectric and electronic apparatus for recording the formation of paper in which means are provided for automatically compensating for variations in the average thickness of the paper and variations in the intensity of the light source itself.

According to the invention apparatus for indicating and/or recording the formation of paper comprises: light sensitive means for producing a variable current representative of variations in the transparency of the paper; a light source for projecting a beam of light through said sheet of paper onto said light sensitive means; means for generating an alternating carrier current; a modulator for modulating said carrier current in accordance with the variations in said variable current to produce a modulated carrier current; control means for automatically maintaining the magnitude of said modulated carrier current at a level such as to compensate for variations in said variable current unrelated to the formation of the paper; a demodulator for demodulating said modulated carrier current to produce a component representative of variations in the transparency of the paper due to variations in the formation thereof; and indicating means for indicating the magnitude of said component thereby to obtain an indication representatiive of the formation of the paper.

More specifically the apparatus according to the invention comprises: light sensitive means for producing a variable current representative of variations in the transparency of the paper; a light source for projecting a beam of light through said sheet of paper onto said light sensitive means; an oscillator for generating a radio frequency oscillatory current; a modulator for modulating said oscillatory current with said variable current thereby to produce a modulated radio frequency signal; an amplifier for amplifying said signal; automatic gain control means for maintaining the magnitude of the amplified modulated radio frequency signal in the output circuit of said amplifier at a level such as to compensate for variations in said variable current unrelated to the formation of the paper; a demodulator for demodulating said radio frequency signal to produce a component representative of variations in the transparency of the paper due to variations in the formation thereof; and indicating means for indicating the magnitude of said component thereby to obtain an indication representatiive of the formation of the paper.

In order that the invention may be readily understood reference is made to the accompanying drawing which depicts the circuit diagram of apparatus according to one practical form of the invention.

Referring to the drawing a light beam from a suitable light source such as an exciter lamp (not shown) is projected through the travelling sheet of paper onto light sensitive means such as a photoelectric cell 3. The light source and the photoelectric cell 3 are situated in proximity to the travelling sheet of paper during its manufacture so that variations in the transparency of the paper will cause variations in the intensity of the light impinging on the photoelectric cell. Included in the cathode circuit of the cell is a load resistor 4 which is shunted by a valve 5.

The apparatus also includes an oscillator 6 comprising the valve 7 connected to function in a Hartley type oscillator circuit for generating an alternating radio frequency oscillatory or carrier current.

The output from the oscillator 6 is applied to the grid of the valve 5 so that the valve 5 will function as a variable impedance when current flows through the load resistor 4.

The output at the cathode circuit of the photoelectric cell 3 will thus be a radio frequency carrier current or signal which is modulated by the variations in current flowing through the photoelectric cell 3. This output is applied to the grid of valve 8 which is connected to operate as a cathode follower amplifier, the amplified signal then being applied to the valve 9 which is adapted to operate as a threshold adjuster. The threshold adjuster 9 functions to prevent any spurious signal of the frequency of the radio frequency signal passing therethrough i. e. it will only pass signals exceeding a particular magnitude. The cathode follower 8 functions to isolate the load resistance of the photoelectric cell 3 from the threshold adjuster.

The output from the threshold adjuster 9 is applied to a resistance capacitance coupled amplifier 11 which includes the amplifying valves 12 and 13. The amplified signal in the output circuit of the valve 13 is applied to the grid circuit of a further valve 14 which is connected to function as an amplifier the output from which is applied to a rectifier circuit 15 and a demodulator 16.

The time constants of the rectifier circuit 15 are arranged to be such that it will develop from the modulated radio frequency signal an output voltage representative of variations in the transparency of the paper which are unrelated to the formation of the paper, i. e. variations due to changes in the average thickness of the paper or variations in the intensity of the light source. The time constants of the demodulator 16 are arranged to be such that it will develop from the modulated radio frequency signal an output voltage representative of variations in the transparency of the paper which are related to the formation of the paper.

The rectified output from the rectifier circuit 15 is applied as a positive voltage to the grid of valve 17 which is connected in shunt with the screen grid of the amplifying valve 13. The rectifier circuit 15, the valve 17 and the valve 13 combine to form an automatic gain control means or circuit.

The output from the demodulator 16 is applied to the valve 18 which is connected to function as an amplifier. The amplified signal from the valve 18 is applied to a threshold adjuster which includes the valve 19 and thence to the output valve 21 which preferably has a low output impedance. The signal is then applied to suitable indicating means such as the rectifier metering circuit 22. The threshold adjuster 19 regulates the threshold level of the input to the valve 21 i. e. it will only pass signals exceeding a particular magnitude.

Suitable operating potentials are obtained from a conventional power pack 23.

In the operation of the apparatus to obtain an indication regarding the formation of a travelling sheet of paper during the manufacture thereof the bias applied to the valve 17 is initially adjusted so that the valve is just on the point of conducting when the transparency of the paper is least.

With variations in the transparency of the moving sheet of paper there will be corresponding variations in the current flowing through the photoelectric cell 3 and the load resistor 4 and thus the radio frequency signal will be modulated in accordance with the variations in that current. The variable current flowing through the load resistor 4 may be considered as including two variable components, a first component representative of variations in the transparency of the paper due to factors unrelated to the formation of the paper and a second component representative of variations in the transparency of the paper related to changes in the formation of the paper, i. e. the degree of wildness of the paper.

The rectifier circuit 15 will develop from the modulated radio frequency signal an output which is representative of the first component. If this component increases, the output from the rectifier circuit 15 will also increase thereby causing the positive voltage applied to the grid of the valve 17 also to increase. The conductivity of the valve 17 thus will also increase thereby reducing the screen grid voltage and the gain of valve 13. Thus the output from the valve 8 is so automatically regulated by the automatic gain control circuit that variations in this first component are automatically compensated for and will have no effect on the indicating means.

The demodulator 16 will develop from the modulated radio frequency signal an output which is representative of the second component. This output is amplified and applied to the metering circuit 22 and the circuit 22 will thus give an indication which is a measure of the formation of the paper.

Since the output of the valve 21 can be utilized to actuate a stylus which is caused to mark a sheet of graph or similar paper, a permanent record can be obtained of variations in the formation of a sheet of paper during its manufacture.

In practice it has been found that the component in the output of the photo-electric cell 3 which is related to the formation of the paper has a frequency within the range of 25 to 1000 cycles per second and the component which is unrelated to the formation of the paper has a frequency of 1 cycle per second or less. At these frequencies the oscillator is adjusted to give an output having a frequency of 50,000 cycles. To provide the proper time constants for the rectifier 15 and the demodulator 16 the capacitor and the resistor in the cathode circuit of the rectifier 15 have values of 100 microfarads and 15,000 ohms respectively while the capacitor and the resistor in the cathode circuit of the demodulator 16 have values of 0.005 microfarads and 50,000 ohms respectively.

Having now described my invention, what I claim as new and desire to secure by Letters Patent is:

1. Apparatus for testing the structure of a moving sheet of paper after it has been formed, comprising: light sensitive means for producing a variable current representative of variations in the transparency of the paper; a light source for projecting a beam of light through said sheet of paper onto said light sensitive means; means for generating an alternating carrier current; a modulator for modulating said carrier current in accordance with the variations in said variable current to produce a modulated carrier current; control means for automatically maintaining the magnitude of said modulated carrier current at a level such as to compensate for variations in said variable current unrelated to the formation of the paper; a demodulator for demodulating said modulated carrier current to produce a component representative of variations in the transparency of the paper due to variations in the formation thereof; and indicating means for indicating the magnitude of said component thereby to obtain an indication representative of the formation of the paper.

2. Apparatus for testing the structure of a moving sheet of paper after it has been formed, comprising: light sensitive means for producing a variable current representative of variations in the transparency of the paper; a light source for projecting a beam of light through said sheet of paper onto said light sensitive means; an oscillator for generating a radio frequency oscillatory current; a modulator for modulating said oscillatory current with said variable current thereby to produce a modulated radio frequency signal; an amplifier for amplifying said signal; automatic gain control means for maintaining the magnitude of the amplified modulated radio frequency signal in the output circuit of said amplifier at a level such as to compensate for variations in said variable current unrelated to the formation of the paper; a demodulator for demodulating said radio frequency signal to produce a component representative of variations in the transparency of the paper; due to variations in the formation thereof; and indicating means for indicating the magnitude of said component thereby to obtain an indication representative of the formation of the paper.

3. Apparatus according to claim 1, wherein said control means comprises a rectifier circuit the time constants of which are arranged to be such that it will develop from said modulated carrier current an output control voltage representative of variations in said variable current unrelated to the formation of the paper, and means for utilising said output control voltage to control the magnitude of said modulated carrier current.

4. Apparatus according to claim 2, wherein said automatic gain control means comprises a rectifier circuit the time constants of which are arranged to be such that it will develop from said modulated radio frequency signal an output voltage representative of variations in said variable current unrelated to the formation of the paper, and a net work for utilising said output voltage to control the gain of said amplifier.

5. Apparatus according to claim 4, wherein said amplifier includes a screen grid amplifier valve and wherein said network includes a valve having a grid circuit to which the said voltage is arranged to be applied so as to control the impedance of said valve, said valve being connected in shunt with the screen grid electrode of said screen grid amplifier valve thereby to control the gain of said screen grid amplifier valve.

6. Apparatus according to claim 1, and including a circuit comprising an amplifier for amplifying the output voltage from said demodulator, an output circuit including an output valve for applying the amplified signal to the indicating means, and a threshold adjuster for regulating the level of the input to said output circuit.

7. Apparatus according to claim 2, and including a circuit comprising an amplifier for amplifying the output voltage from said demodulator, an output circuit including an output valve for applying the amplified signal to the indicating means, and a threshold adjuster for regulating the level of the input to said output circuit.

8. Apparatus according to claim 1, wherein the light sensitive means comprises a photoelectric cell, and wherein said light source comprises an exciter lamp, said cell having a load resistor connected in its cathode circuit.

9. Apparatus according to claim 2, wherein the light sensitive means comprises a photoelectric cell, and wherein said light source comprises an exciter lamp, said cell having a load resistor connected in its cathode circuit.

10. Apparatus according to claim 1, wherein the light sensitive means comprises a photoelectric cell, and wherein said light source comprises an exciter lamp, said cell having a load resistor connected in its cathode circuit, and wherein said modulator comprises a valve connected in shunt with said load resistor and having its grid circuit connected to said generator or oscillator.

11. Apparatus according to claim 2, wherein the light sensitive means comprises a photoelectric cell, and wherein said light source comprises an exciter lamp, said cell having a load resistor connected in its cathode circuit, and wherein said modulator comprises a valve connected in shunt with said load resistor and having its grid circuit connected to said generator or oscillator.

12. Apparatus according to claim 2, and including a threshold adjuster connected in the circuit from said modulator to said amplifier for preventing spurious signals of the signal frequency passing through to said amplifier.

13. Apparatus according to claim 2, wherein the light sensitive means comprises a photoelectric cell, and wherein said light source comprises an exciter lamp, said cell having a load resistor connected in its cathode circuit, in combination with a threshold adjuster connected in the circuit from said modulator to said amplifier for preventing spurious signals of the signal frequency passing through to said amplifier, and wherein said load resistor is isolated from said threshold adjuster by a circuit comprising a cathode follower amplifier.

References Cited in the file of this patent

UNITED STATES PATENTS

| | | |
|---|---|---|
| 1,882,962 | Sawford | Oct. 18, 1932 |
| 2,549,402 | Vossberg | Apr. 17, 1951 |